(12) United States Patent
Volkmann

(10) Patent No.: US 7,368,671 B2
(45) Date of Patent: May 6, 2008

(54) VACUUM CONVEYING APPARATUS WITH A WEIGHING OR METERING DEVICE

(75) Inventor: Thilo Volkmann, Soest (DE)

(73) Assignee: Volkman GmbH, Soest (DE)

( * ) Notice: Subject to any disclaimer, the term of this patent is extended or adjusted under 35 U.S.C. 154(b) by 640 days.

(21) Appl. No.: 10/912,315

(22) Filed: Aug. 5, 2004

(65) Prior Publication Data
US 2005/0079018 A1 Apr. 14, 2005

(30) Foreign Application Priority Data
Aug. 5, 2003 (DE) .......................... 203 12 073 U

(51) Int. Cl.
*B65G 51/00* (2006.01)
*G01G 17/00* (2006.01)

(52) U.S. Cl. ........................................ 177/116; 222/77
(58) Field of Classification Search ........ 177/116–122; 222/55, 56, 77
See application file for complete search history.

(56) References Cited
U.S. PATENT DOCUMENTS

| | | | | |
|---|---|---|---|---|
| 2,846,177 A | * | 8/1958 | Knobel | .................. 177/78 |
| 3,693,836 A | * | 9/1972 | Eisner | .................. 406/99 |
| 4,481,985 A | * | 11/1984 | Bruder et al. | .................. 141/1 |
| 5,458,450 A | * | 10/1995 | Webb et al. | .................. 414/21 |
| 5,670,751 A | | 9/1997 | Häfner | |
| 6,527,141 B2 | * | 3/2003 | Sanders | .................. 222/1 |

FOREIGN PATENT DOCUMENTS

| | | |
|---|---|---|
| DE | 42 002 40 | 7/1993 |
| DE | 93 19 542.7 | 4/1994 |
| DE | 199 23757 | 11/2000 |
| DE | 101 53 245 | 5/2003 |
| GB | 2 009 430 A | 6/1979 |

* cited by examiner

Primary Examiner—Randy W Gibson
(74) Attorney, Agent, or Firm—Fay Sharpe LLP

(57) ABSTRACT

A Vacuum conveying apparatus with a weighing and metering device, comprises a separation container (10), acted on by a vacuum, for intermittent intermediate storage of material conveyed in a suction gas flow, a force isolation means for entry of conveyed material into the separation container (working side), a weighing device (50) for, in particular, continuous weighing of the separation container, as well as a vacuum pump (70) and a controller. In order to create a vacuum conveying apparatus that can guarantee a more precise weighing and/or a more accurate stipulation of the timepoint for turning off the vacuum pump or for interrupting the suction process during the ongoing conveyance process, the vacuum pump (70) is isolated in terms of force from the separation container (10) and is also situated such that it is not weighed.

19 Claims, 6 Drawing Sheets

VACUUM CONVEYING APPARATUS WITH A WEIGHING OR METERING DEVICE

The invention under consideration concerns a vacuum conveying apparatus with a weighing or metering device having the features of the preamble of Claim 1.

BACKGROUND OF THE INVENTION

Vacuum conveyors are usually used for transporting small-particle or powdery material, such as powders, granules, dusts, tablets, or small parts in a suction gas flow, which, as a rule, consists of air or inert gas. The material is suctioned off from a supply site via, for example, a manual suction tube or a feed funnel, is transported through a hose or tube conduit, and arrives at the separation chamber of the vacuum conveyor via a suction opening. There the suction gas is separated from the transported material, which is collected in the separation container, and if need be, a filter element is downstream from the gas side. The suction gas leaves the separation chamber in the direction of the vacuum pump, which is usually fixedly installed directly on the upper side of the separation chamber.

In a standard vacuum conveyor, a discharge valve, through which the material can leave the separation chamber, to fall directly into a packaging container, is as a rule located on the underside of the separation container. In addition, a gas valve can be situated between the separation container and the vacuum pump.

During the suctioning process, the so-called suction cycle, the discharge valve is closed and the gas valve between the separation container and vacuum is opened. The separation container is thus filled for a certain prespecified time or until a specific degree of filling with material has been reached. Subsequently, in the so-called discharge cycle, the gas valve between the separation container and vacuum is closed or the vacuum pump is shut off and the discharge valve is opened. The transported material then falls, in the simplest case, through the discharge opening from the separation container. If necessary, however, the material can also be blown out from the separation container by excess pressure, or bridge-building materials can be fluidized. By counter-blowing from the pure gas site, the filter can also be cleared of adhering filter cake. A cycle control regulates the duration of the individual suction and discharge cycles.

Some vacuum conveyors also permit, in addition to simple transporting, the possibility of metering conveyed material. Above all, such vacuum conveyors with a metering function differ from vacuum conveyors without a metering function in that after switching off the vacuum pump or interrupting the suction, the discharge valve remains closed for sufficient time that the conveying process in the separation container comes to a complete standstill; thus, all of the material which was still in suspension has settled in the separation container. Afterwards, the conveyed quantity of material is weighed via a weighing device. This is done, for example, such that the vacuum conveyor rests on a weighing device, such as a frame construction with a system of, for example, three working-load weighing cells. This measures the total weight of the vacuum conveyor plus the conveyed material contained therein.

Subsequently, the discharge valve is opened. Afterwards and/or beforehand, the tare of the vacuum conveyor is weighed in order to determine the quantity of conveyed material removed. This repeated weighing is undertaken because experience shows that a one-time tare at the beginning of the conveying process is not sufficient. This is because the mass of conveyed material adhering to the filter of the vacuum conveyor and to the walls of the separation container changes from conveying cycle to conveying cycle, and thus falsifies the measurements.

In order to attain a larger metering quantity of conveyed material than is possible in one suction cycle, the material is conveyed in several suction cycles. A controller determines beforehand the number of required suction cycles and the theoretical filling quantity per suction cycle. Usually, in the first cycles, larger quantities of material are conveyed with rapid filling cycles; in the last cycles, if desired, operation is in the flying conveyance mode, guaranteeing a very continuous conveyance so that one can better approximate the nominal conveyed quantity. This process is very time-consuming.

Therefore, the procedure then became one of weighing the vacuum conveyor continuously during conveyance. Shortly before attaining the theoretical filling quantity for a specific suction cycle, the vacuum pump was switched off or the suction process was interrupted. This procedure is faster, but weighing accuracy suffers under the changing transverse forces that act on the separating container during the conveyance operation. In actual practice, it has become evident that the metering accuracy of these vacuum conveyance devices is often insufficient. Depending on the conveyed material, deviations result of 20 to 500 g from the actual conveyed quantity to be attained (target quantity).

FIG. 1 shows a view of a prior vacuum conveyor 100 with a metering function. As indicated in FIG. 1, the vacuum conveyor sits in a frame construction 120 on a 3-point weighing apparatus 150 and carries a vacuum pump 170 on its separation container 110. Since the vacuum conveyor is continuously weighed during the conveyance process, the weighing must suppress or minimize disturbing forces and influences as much as possible.

To this end, among other things, the entry side of the separation container was provided with an isolation system 140. As can be seen in FIG. 1, an isolator is connected to the entry opening of the separation container; its other end is firmly connected with the frame construction, where the (nondepicted) hose or tube system of the working side is connected. This isolation system is intended to guarantee that the forces generated by the transported material do not have a disturbing effect on the weighing.

It has become evident, however, that these measures are not sufficient to limit influences disturbing the weighing to an acceptable level. These disturbing influences derive essentially from the recurring differences in vacuum level within the transport conduit, whose disturbing transverse force influence cannot be compensated for with the previously known methods, in spite of a force isolation. The force isolation serves rather to avoid impacts and mechanical tensions that are generated by the conveyed product and the inherent weight of the transport conduit. Since determination of the timepoint for shutting off the vacuum pump or interrupting the suction process is done on the basis of weighing the vacuum conveyor, this point is arrived at only insufficiently among previous vacuum conveyors. The stipulated target value for the conveyed quantity is not attained precisely enough, as the deviations further discussed above already make clear.

THE INVENTION

Therefore, the problem is to create a vacuum conveying apparatus that can guarantee a more precise weighing and/or a more accurate stipulation of the timepoint for turning off the vacuum pump or for interrupting the suction process during the ongoing conveyance process.

To solve this problem, a vacuum conveying apparatus with the features of Claim 1 is proposed. Accordingly, the invention is based on the basic idea that in a vacuum conveying apparatus with a weighing or metering device, which comprises a separation container, acted on by a vacuum, for intermittent intermediate storage of material conveyed with a suction flow, a weighing device for, in particular, continuous weighing of the separation container, as well as a vacuum pump 70 and a controller, the vacuum pump 70 is isolated in terms of force from the separation container to which the suction Pipe of the vacuum pump is directly connected to.

Force isolation of the vacuum pump and the separation container offers the advantage that the total mass to be weighed is reduced by the weight of the vacuum pump and perhaps the parts belonging to it, thus permitting greater weighing resolution. In addition, force fluctuations at the vacuum pump during the conveyance process no longer influence the weighing device.

The invention has recognized that the disturbances stemming from transverse force influences caused by the pressure difference between the vacuum conveyor and the surroundings in particular, persistently influence the weighing. They are also subject to fluctuations as a result of the fluctuating vacuum level within the vacuum conveyor.

According to the invention, the separation container has in addition to the inlet opening for entry of the conveyed material into the separation container (working side of the vacuum conveyor apparatus) in the area of the outlet opening for discharge of the suction gas (pure gas side of the vacuum conveying apparatus) a force isolator as well. A vacuum conduit is then preferably connected to the outlet opening and leads to the vacuum pump. A substantial number of the disturbing transverse forces are compensated for, in that the entry and outlet suction Gas openings of the separation container point in opposite directions and are also preferably arranged coaxially. In this way, it is advantageously possible for the control to appropriately stipulate the theoretical filling quantities for the next cycle, somewhat larger or smaller, with appreciable success, based on the quantity actually conveyed in each suction cycle. That improves the metering accuracy and accelerates the metering time.

The aforementioned and the claimed components to be used according to the invention, described in the embodiment examples, are not subject to any special exceptional conditions as to their size, shape, material selection, and technical conception, so that selection criteria known in the application area can be used without any restrictions.

Additional details, features, and advantages of the object of the invention can be deduced from the subclaims and from the following description of the pertinent drawings, in which several embodiments of the vacuum conveying apparatus according to the invention are shown by way of example. The figures in the drawing show the following:

PREFERRED EMBODIMENT

Figure 1:
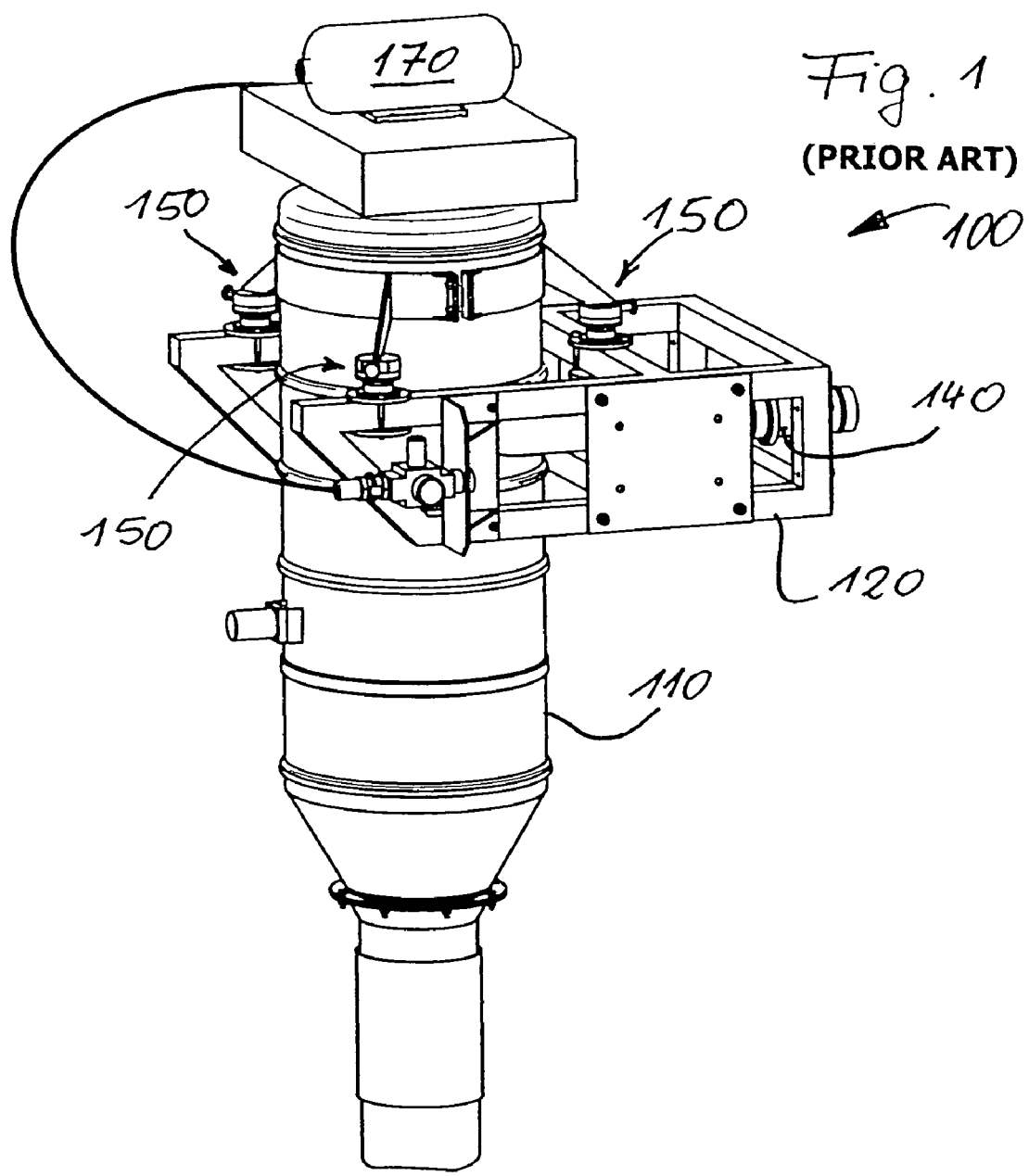
FIG. 1, a vacuum conveying apparatus according to the state of the art.
Figure 2:
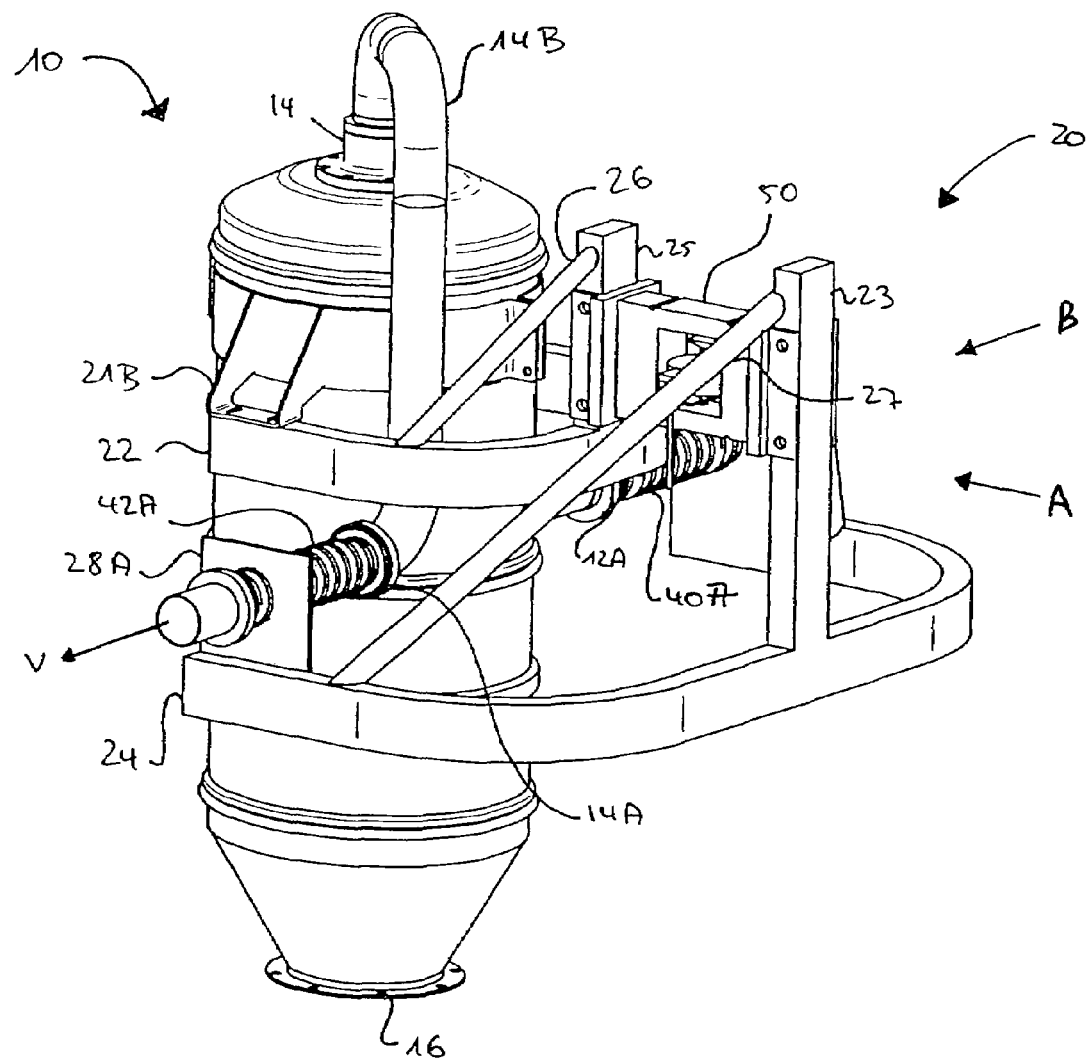
FIG. 2, a separation container and a holding device of an embodiment of a vacuum conveying apparatus according to the invention, in a perspective view.
Figure 3:
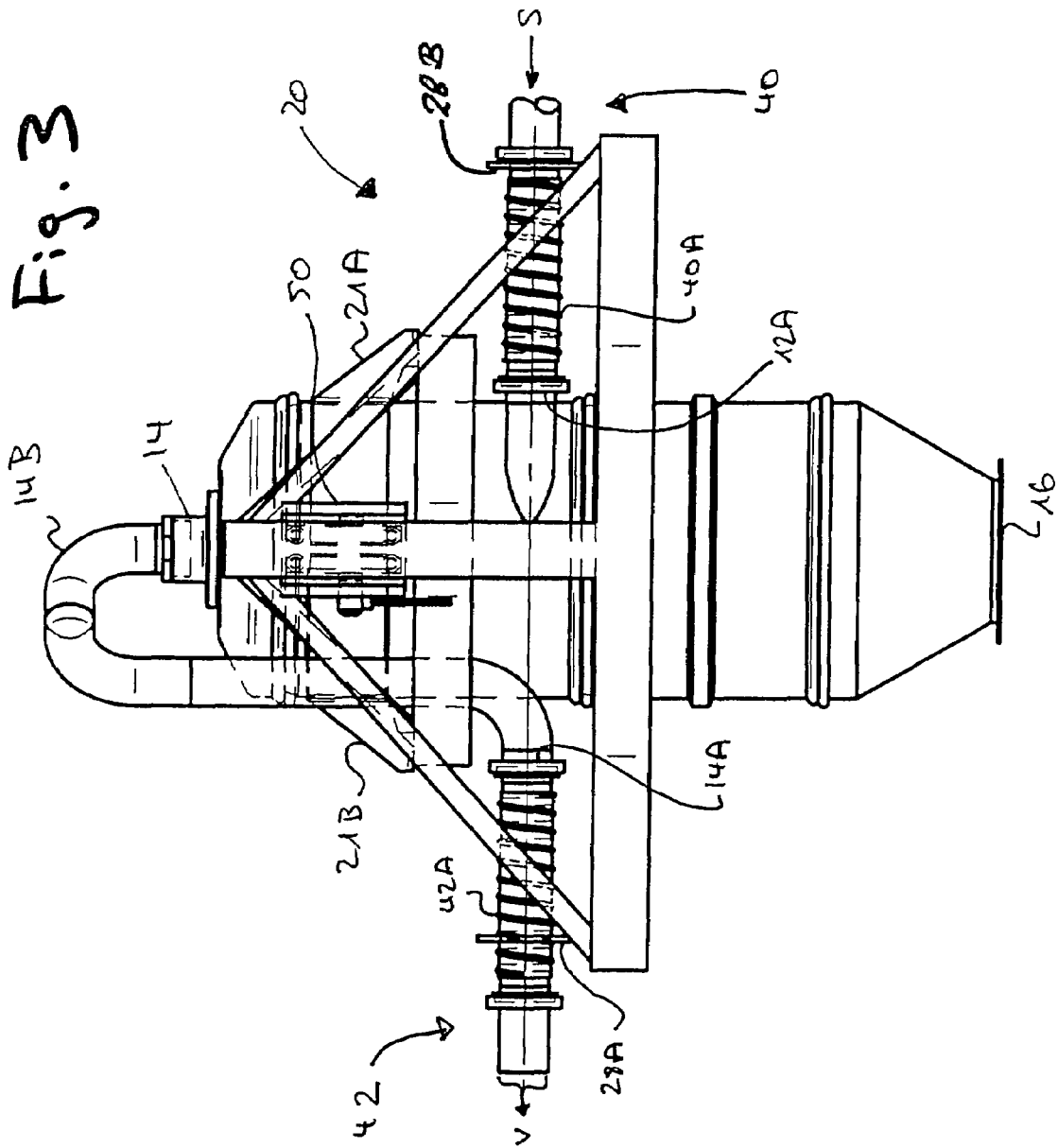
FIG. 3, the same elements from FIG. 2, in a view from approximately the direction of arrow A in FIG. 2 (backside view)
Figure 4:
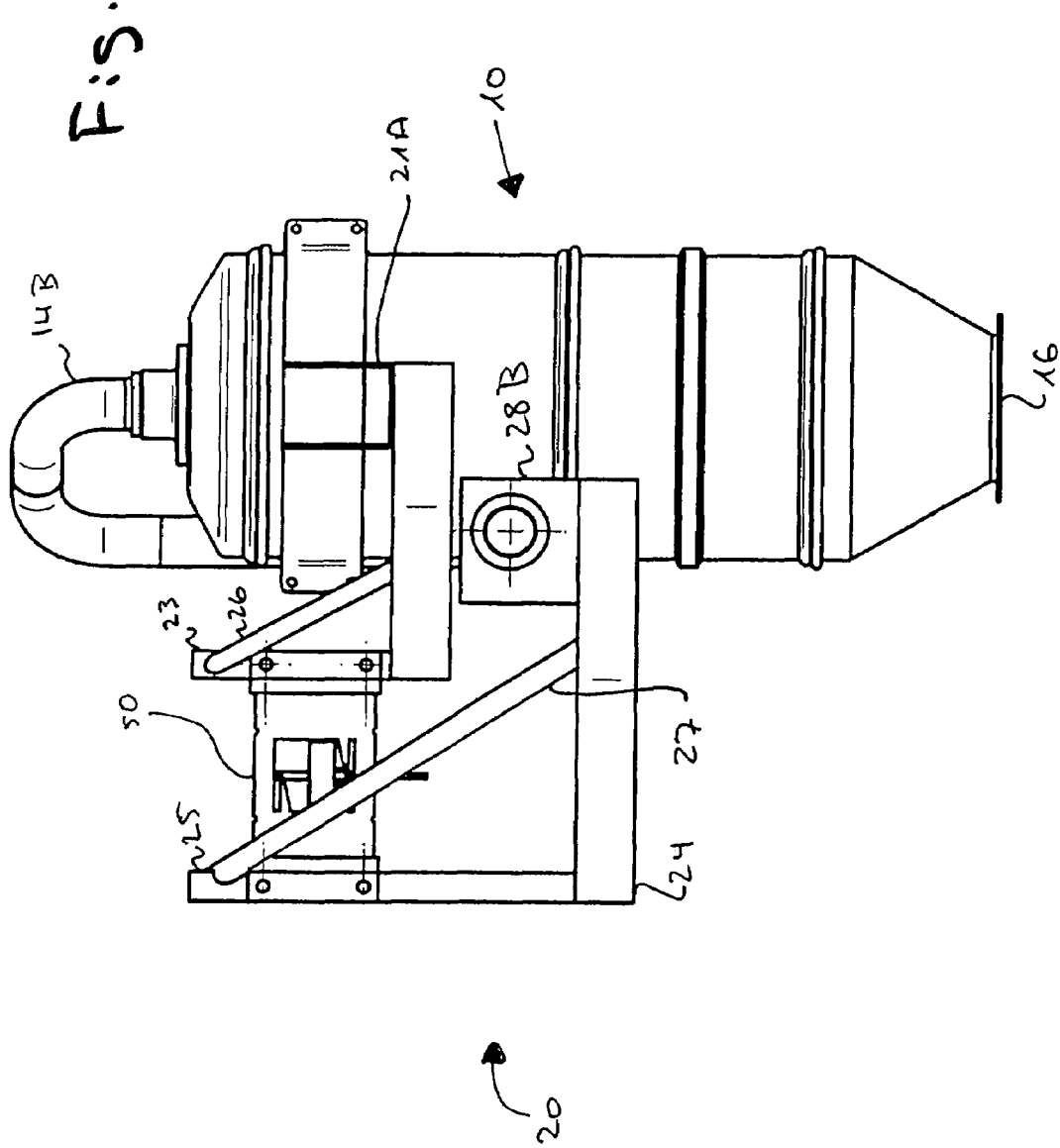
FIG. 4, the same elements from FIGS. 2 and 3, in a view from approximately the direction of arrow B from FIG. 2 (entry side view)

FIGS. 2-5 show different views of a vacuumtight separation container 10 and a holding device 20 of an embodiment of a vacuum conveying apparatus, according to the invention.

The separation container has a lateral entry opening 12A for conveyed material, provided with a somewhat tangential inlet connection 12, a head-side outlet connection 14 for suction gas, and a bottom-side vacuumtight discharge device 16, such as a discharge valve (not depicted) or a discharge flap (depicted) by means of which the conveyed material can be removed after every conveying cycle.

Figure 6:
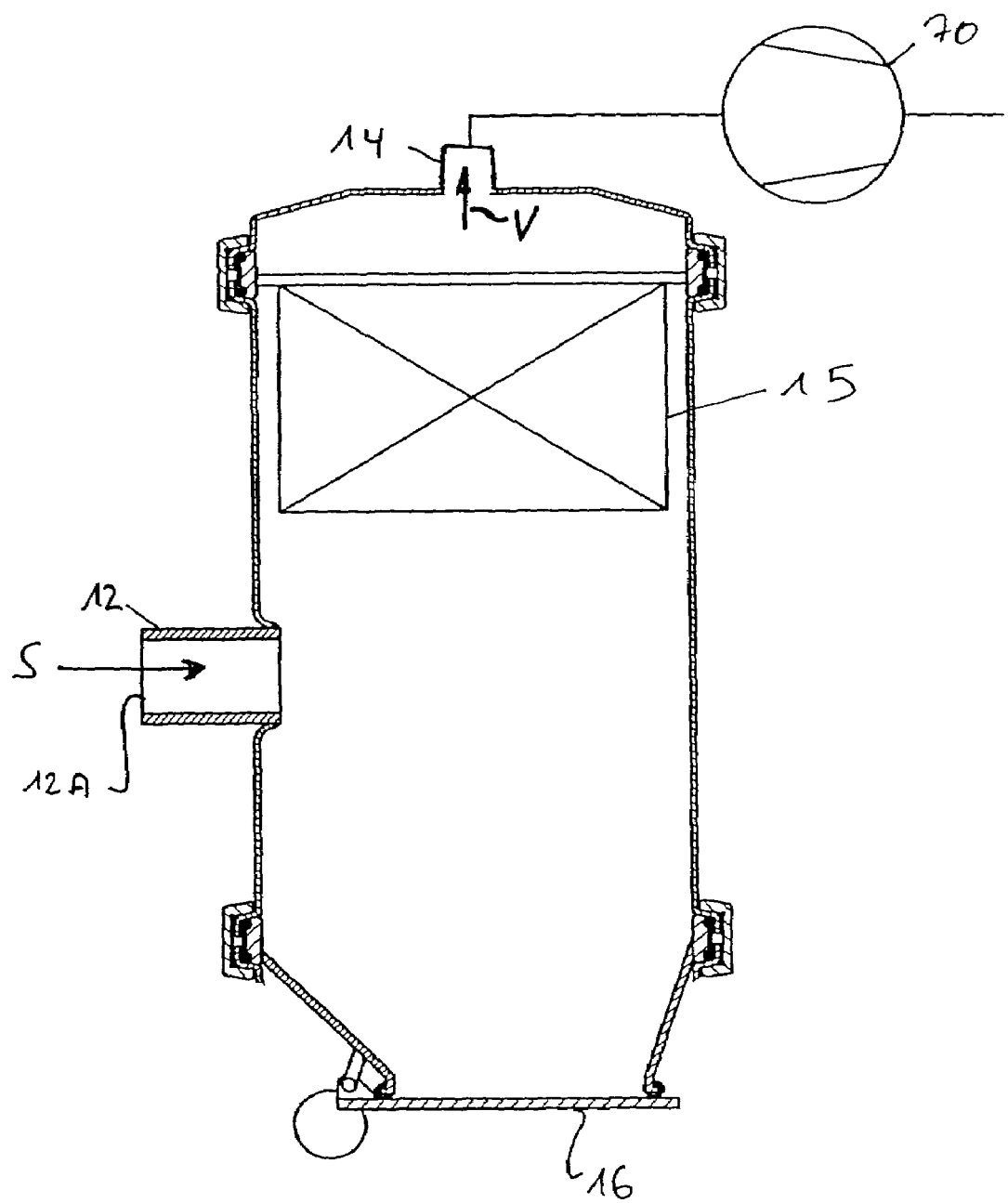
FIG. 6, a separation container in a vertical, sectional view (schematic and without a holding device).

FIG. 6 shows the separation container 10 in a schematic vertical section. The conveyed material arrives at the interior of the separation container through the inlet connection 12 in the suction gas flow S. The suction gas is suctioned by the vacuum pump 70 (schematically indicated). It leaves the separation container 10 through the outlet opening 14 (vacuum flow V), passing a filter 15 beforehand. The conveyed material is collected on the closed discharge device 16, which here is formed as a discharge flap.

As can be seen in FIGS. 2-5, the vacuum conveying apparatus has force isolation means (force isolators 40A, 42A) within a suction conduit (40) (working side), leading in vacuumtight manner to the inlet opening 12A of the separation container, and within the vacuum conduit 42 (pure gas side), running from the outlet connection 14 to the vacuum pump 70. The force isolation means are designed as flexible, vacuum-pressure-resistant tubular elements in the embodiment under consideration. The force isolators on the working and pure gas sides are preferably located such that they run coaxially with one another. It is particularly preferable for this coaxial area to lie perpendicular to the main axis of the separation container 10. For this purpose, a rigid tubular bend 14B is joined to the outlet connection 14 of the separation container 10. In the depicted embodiment, this is designed such that for a U-bend with legs directed downwards, the outlet connection 14 on one end adjoins the head of the separation container 10 in the middle, and at the other end, after a 90° arc, adjoins in a vacuumtight manner the force isolator 42A, which leads away from the separation container 10. The entry opening 12A of the separation container 10 and the outlet opening 14A, located at the end of the tubular bend 14B, are situated such that they open out in opposite directions. In this way, the reaction forces of the vacuum within the separation container 10 essentially cancel one another. This occurs in a particularly complete manner if the oppositely directed mouths are on the same axis. A fine coordination of the reaction forces can, moreover, also be effected by selection of the flow cross-sections of the entry opening 12A and entry connection 12, in comparison to the outlet connection 14, the tube 14B, and the outlet opening 14A. Similarly, it is to advantage if the force isolators 40A, 42A, and the connections of the mouths of the suction conduit 40 and the vacuum conduit 42 to the entry opening 12A and to the outlet opening 14A are aligned. The force isolation means 40A, 42A ensure that disturbing effects and forces coming from the suction conduits do not have an effect on weighing the separation container, or have only an insubstantial effect. This force compensation and force isolation can be effected in a particularly simple manner with the holding device 20, described in more detail below.

In the depicted and preferred embodiment, the holding device 20 consists of two independent holding frames 22 and 24. These frames, viewed from above (FIG. 5), are approximately U-shaped and have vertical supports 23 and 25, respectively, in the middle of the Us. Diagonal braces 26 and 27, respectively, run between the vertical supports 23 and 25 and the holding frames 22 and 24. There is a connection of the two holding frames in the form of a weighing device 50 between the two vertical supports 23 and 25.

Figure 5:
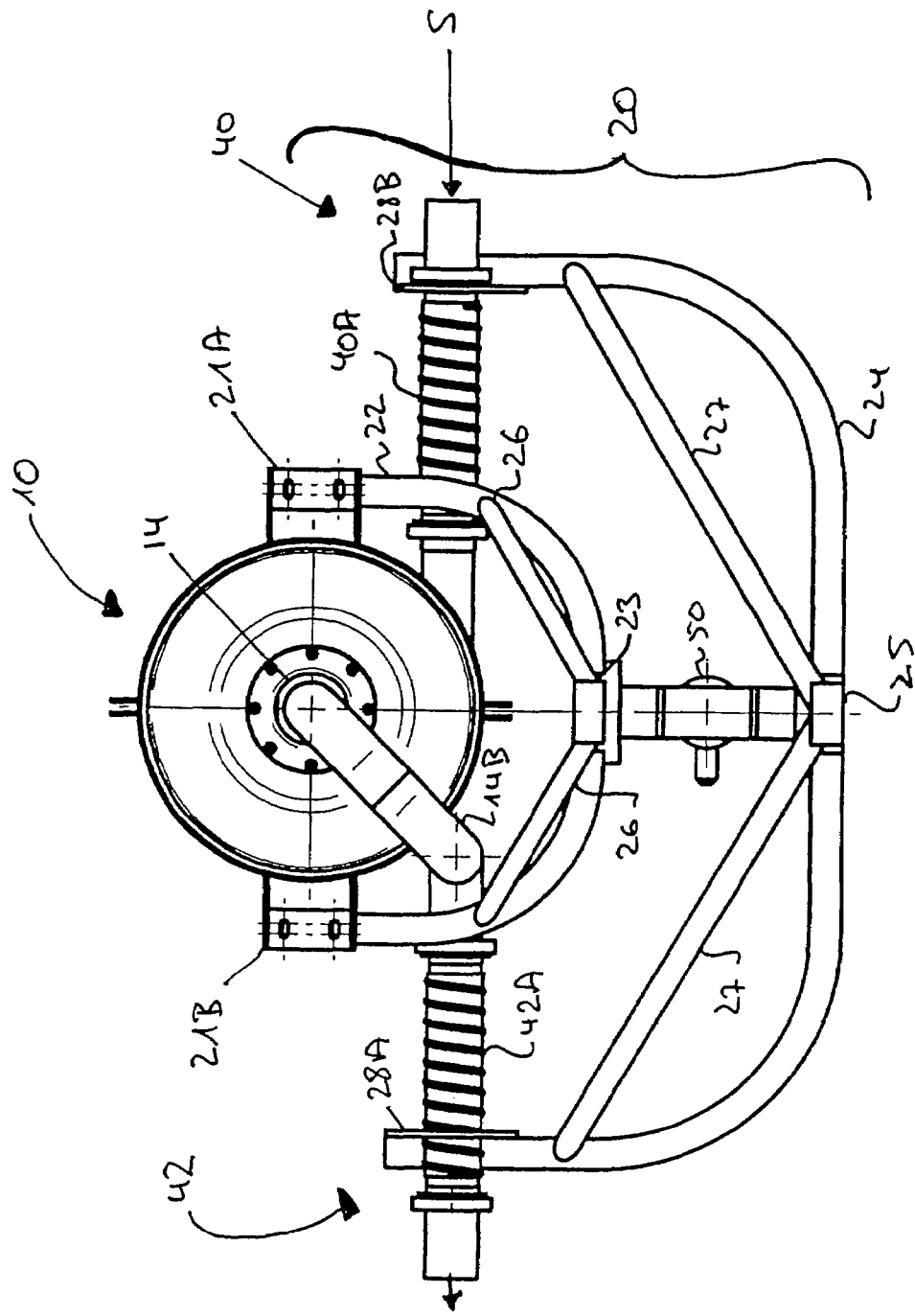
FIG. 5, the same elements from FIG. 2-4, in a view from above.

With respect to each other, the holding frames 22 and 24 are preferably located such that, seen from above as in FIG. 5, the holding frame 22 lies at least partially within and optionally above the holding frame 24. In addition, the vertical support 23, the vertical support 25, and the center of the separation container 10 essentially and preferably lie in a straight line (see from above). The legs of the inner holding frame 22 extend approximately to the middle of the separation container 10. This is connected with the leg ends of the holding frame 22 via two collar arms 21A, 21B fastened to a mounting strap encompassing the container.

Attached to the legs of the outer holding frame 24 is at least one holding means 28B, 28A respectively for the suction conduit 40 and vacuum conduit 42 for the entry opening 12A and outlet opening 14A of the separation container 10. Preferably, the working-side suction conduit is designed such that the tubes or hoses leading to the separation container shut off with the holding means 28B. The force isolator 40A is connected here. Preferably, this extends to the entry opening 12A of the separation container 10. The arrangement of the force isolator 42A and the vacuum conduit 42 on the vacuum side is similar. Since conveyed material is not transported by the pure-gas-side suction conduit (vacuum conduit), a simpler solution can also be selected there. Thus, as in the embodiment example under consideration, the holding means 28A can also be simply a plate provided with a circular opening through which the force isolator 42A or a suction conduit is inserted.

The two-part weighing frame 22, 24 is also of inventive importance independent of the force isolation of the vacuum conveying apparatus, and in particular it offers the advantage that the container to be weighed can be incorporated and removed in a simple manner. To this end, the connection between the separation container and the holding frame 22 can, on the one hand, be detached. Preferably, however, the connection between the holding frame 22 and 24, in the area of the weighing cell 50, will be detached, via a quick-action clamp system, for example. In both cases, the entry and exit sides must be separated with respect to the suction conduit 40 and the vacuum conduit 42 in the area of the force isolators, via simple hose clips for example. In this way, a simple replacement of the separation container 10 is possible, for a product change, for example. Also, cleaning of the separation container is thus made easier.

Due to the fact that the suction gas passes the filter 15 before leaving the separation container 10, an unavoidable filter differential pressure arises between the working and vacuum side. Since the filter differential pressure, however, is on the one hand relatively low, and is on the other hand constant in many cases, it can be ignored and the weighing result corrected by calculation using the disturbing factor from the filter differential pressure.

| Reference symbol list | |
|---|---|
| 10 | Separation container |
| 12 | Inlet connection |
| 12A | Entry opening |
| 14 | Outlet connection |
| 14A | Outlet opening |
| 14B | Tubular bend |
| 15 | Filter |
| 16 | Discharge device |
| 20 | Holding device |
| 21A | Collar arm |
| 21B | Collar arm |
| 22 | Holding frame |
| 23 | Vertical support |
| 24 | Holding frame |
| 25 | Vertical support |
| 26 | Diagonal brace |
| 27 | Diagonal brace |
| 28A | Holding means |
| 28B | Holding means |
| 40 | Suction conduit |
| 40A | Force isolator |
| 42 | Vacuum conduit |
| 42A | Force isolator |
| 50 | Weighing device |
| 70 | Vacuum pump |
| 100 | Known vacuum conveyor |
| 110 | Separation container |
| 120 | Frame construction |
| 140 | Isolation system |
| 150 | Weighing device |
| 170 | Vacuum pump |

The invention claimed is:

1. Vacuum conveying apparatus with a weighing and metering device, said vacuum conveying apparatus comprising:
   a separation container (10), acted on by a vacuum, for intermittent intermediate storage of material conveyed in a suction gas flow,
   a weighing device (50) for weighing of the separation container,
   a vacuum pump (70) and a controller, wherein:
   the separation container (10) is vacuumtight and comprises a vacuumtight discharge device (16);
   an entry opening (12A) for entrance of conveyed material into the separation container (10) is connected in a vacuumtight manner through a first (working side) force isolation means to a suction conduit (40);
   an outlet opening (14A) for exit of suction gas from the separation container (10) is connected in a vacuumtight manner through a second (pure gas side) force isolation means to a vacuum conduit (42);
   the vacuum pump (70) is isolated in terms of force from the separation container (10) and is also situated such that it is not weighed by the weighing device (50);
   the entry and outlet openings (12A, 14A) point in opposing directions; and,
   the first and second force isolation means comprise respective flexible, vacuum-pressure-resistant elements arranged at least approximately coaxially relative to each other.

2. Vacuum conveying apparatus according to claim 1, further comprising:
   an inner holding frame (22) for a connection with the separation container (10), and an outer holding frame (24), which has holding means (28A, 28B) for the suction conduit on the working side and for the vacuum conduit on the pure gas side.

3. Vacuum conveying apparatus according to claim 2, wherein the first and second force isolation means are arranged between the outer holding frame (24) and the entry and outlet openings (12A; 14A) to the separation container (10), respectively.

4. Vacuum conveying apparatus according to claim 2, wherein the inner and/or outer holding frames (22, 24) are designed approximately in a U shape.

5. Vacuum conveying apparatus according to claim 4, wherein the inner and/or outer holding frames (22, 24) are equipped with vertical supports (23, 25) that are placed approximately in the center of the U's.

6. Vacuum conveying apparatus according to claim 2, wherein the weighing device (50) is located and acts between the outer (22) and the inner holding frames (24).

7. Vacuum conveying apparatus according to claim 6, wherein the weighing device is detachably connected to the outer and/or inner holding frames (22, 24).

8. Vacuum conveying apparatus according to claim 1, further comprising a filter (15) in the suction gas flow between the working and pure gas sides, wherein a differential pressure resulting from the filter (15) is compensated by a suitable orientation of the mouth openings (12A, 14A) with respect to one another, and/or of the separation container (10) in the weighing frame.

9. Vacuum conveying apparatus according to claim 3, wherein the inner and/or outer holding frames (22, 24) are designed approximately in a U shape.

10. Vacuum conveying apparatus according to claim 3, wherein the weighing device (50) is located and acts between the outer (22) and the inner holding frames (24).

11. Vacuum conveying apparatus according to claim 4, wherein the weighing device (50) is located and acts between the outer (22) and the inner holding frames (24).

12. Vacuum conveying apparatus according to claim 5, wherein the weighing device (50) is located and acts between the outer (22) and the inner holding frames (24).

13. Vacuum conveying apparatus according to claim 2, further comprising a filter (15) in the suction gas flow between the working and pure gas sides, wherein a differential pressure resulting from the filter (15) is compensated by a suitable orientation of the mouth openings (12A, 14A) with respect to one another, and/or of the separation container (10) in the weighing frame.

14. Vacuum conveying apparatus according to claim 3, further comprising a filter (15) in the suction gas flow between the working and pure gas sides, wherein a differential pressure resulting from the filter (15) is compensated by a suitable orientation of the mouth openings (12A, 14A) with respect to one another, and/or of the separation container (10) in the weighing frame.

15. Vacuum conveying apparatus according to claim 4, further comprising a filter (15) in the suction gas flow between the working and pure gas sides, wherein a differential pressure resulting from the filter (15) is compensated by a suitable orientation of the mouth openings (12A, 14A) with respect to one another, and/or of the separation container (10) in the weighing frame.

16. Vacuum conveying apparatus according to claim 5, further comprising a filter (15) in the suction gas flow between the working and pure gas sides, wherein a differential pressure resulting from the filter (15) is compensated by a suitable orientation of the mouth openings (12A, 14A) with respect to one another, and/or of the separation container (10) in the weighing frame.

17. Vacuum conveying apparatus according to claim 6, further comprising a filter (15) in the suction gas flow between the working and pure gas sides, wherein a differential pressure resulting from the filter (15) is compensated by a suitable orientation of the mouth openings (12A, 14A) with respect to one another, and/or of the separation container (10) in the weighing frame.

18. Vacuum conveying apparatus according to claim 7, further comprising a filter (15) in the suction gas flow between the working and pure gas sides, wherein a differential pressure resulting from the filter (15) is compensated by a suitable orientation of the mouth openings (12A, 14A) with respect to one another, and/or of the separation container (10) in the weighing frame.

19. A vacuum conveying apparatus comprising:
- a separation container for intermittent intermediate storage of material conveyed in a suction gas flow,
- a weighing device for weighing the separation container,
- a vacuum pump and a controller, wherein:
- the separation container is vacuumtight and comprises a vacuumtight discharge device;
- an entry opening in communication with separation container is connected in a vacuumtight manner through a first (working side) force isolator to a suction conduit;
- an outlet opening in communication with the separation container is connected in a vacuumtight manner through a second (pure gas side) force isolator to a vacuum conduit;
- the vacuum pump is in fluid communication with the vacuum conduit and is physically isolated from the separation container such that it is not weighed by the weighing device; and,
- the first and second force isolation means comprise respective flexible, vacuum-pressure-resistant elements arranged at least approximately coaxially relative to each other.

* * * * *